(12) United States Patent
Fu et al.

(10) Patent No.: US 8,516,052 B2
(45) Date of Patent: Aug. 20, 2013

(54) DYNAMICALLY MANAGING ONLINE COMMUNICATION GROUPS

(75) Inventors: Guo Kang Fu, Beijing (CN); Nan Li, Beijing (CN); Jia Wu, Beijing (CN); Xi Ying Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 12/704,961

(22) Filed: Feb. 12, 2010

(65) Prior Publication Data

US 2010/0223335 A1 Sep. 2, 2010

(30) Foreign Application Priority Data

Feb. 27, 2009 (CN) .......................... 2009 1 0118067

(51) Int. Cl.
*G06F 15/16* (2006.01)
(52) U.S. Cl.
USPC ........................................ 709/205; 709/206
(58) Field of Classification Search
USPC .................................................. 709/203–207
See application file for complete search history.

(56) References Cited

U.S. PATENT DOCUMENTS

| | | | |
|---|---|---|---|
| 6,766,014 B2 * | 7/2004 | Flockhart et al. | 379/265.12 |
| 6,988,126 B2 | 1/2006 | Wilcock et al. | |
| 6,996,605 B2 | 2/2006 | Low et al. | |
| 7,127,058 B2 * | 10/2006 | O'Connor et al. | 379/265.01 |
| 7,243,078 B1 | 7/2007 | Lewis-Hawkins | |
| 7,305,436 B2 | 12/2007 | Willis | |
| 7,336,779 B2 | 2/2008 | Boyer et al. | |
| 7,844,668 B2 * | 11/2010 | Canning et al. | 709/206 |
| 8,051,178 B2 * | 11/2011 | Skidgel | 709/227 |
| 8,055,803 B1 * | 11/2011 | Issa et al. | 709/253 |
| 2002/0055973 A1 * | 5/2002 | Low et al. | 709/204 |
| 2002/0073150 A1 * | 6/2002 | Wilcock | 709/204 |
| 2002/0138588 A1 * | 9/2002 | Leeds | 709/217 |
| 2003/0074409 A1 * | 4/2003 | Bentley | 709/206 |
| 2003/0174830 A1 * | 9/2003 | Boyer et al. | 379/265.02 |
| 2004/0078443 A1 * | 4/2004 | Malik | 709/206 |
| 2005/0235034 A1 * | 10/2005 | Chen et al. | 709/206 |
| 2006/0036685 A1 * | 2/2006 | Canning et al. | 709/204 |
| 2008/0183832 A1 * | 7/2008 | Kirkland et al. | 709/206 |
| 2008/0215541 A1 * | 9/2008 | Li et al. | 707/3 |
| 2009/0006979 A1 * | 1/2009 | Callanan et al. | 715/751 |
| 2009/0030981 A1 * | 1/2009 | Knoepp et al. | 709/204 |
| 2009/0138443 A1 * | 5/2009 | Huang et al. | 707/3 |
| 2009/0150397 A1 * | 6/2009 | Chen et al. | 707/9 |
| 2009/0222551 A1 * | 9/2009 | Neely et al. | 709/224 |
| 2010/0125592 A1 * | 5/2010 | Dauginas et al. | 707/758 |
| 2010/0205541 A1 * | 8/2010 | Rapaport et al. | 715/753 |
| 2010/0223335 A1 * | 9/2010 | Fu et al. | 709/205 |

FOREIGN PATENT DOCUMENTS

CN 101276346 A 10/2008

* cited by examiner

*Primary Examiner* — Shirley Zhang
(74) *Attorney, Agent, or Firm* — Steven L. Nichols; Van Cott, Bagley, Cornwall & McCarthy P.C.

(57) ABSTRACT

Dynamically managing an online communication group with a computerized communication tool having at least one processor includes extracting with the computerized communication tool at least one keyword from a private online communication session between at least two parties; and automatically inviting the parties to join an online communication group dedicated to a topic characterized by the at least one keyword with the computerized communication tool.

25 Claims, 4 Drawing Sheets

DYNAMICALLY MANAGING ONLINE COMMUNICATION GROUPS

CROSS-REFERENCE TO RELATED APPLICATIONS

The present application claims priority under 35 U.S.C. §119(a) from Chinese Patent Application No. 200910118067.4, which was filed on Feb. 27, 2009, the entire disclosure of which is incorporated herein by reference.

BACKGROUND

Aspects of the present invention relate to online communication, and more particularly to the dynamic management of online communication groups.

Various instant communication tools, especially chat tools, are widely used in daily business and personal communications. Many companies have implemented the use of instant communication services to enhance the experience of users interacting with their websites. For example, in one possible scenario, customer service representatives (CSR) of an online store or an online consultancy organization may engage in separate online chat sessions with multiple customers to offer customer support.

While live access to a CSR can be very helpful to customers, many CSRs are responsible for maintaining online conversations with multiple customers concurrently. In certain cases, some or all of these customers may be interested in the same or similar products and present similar questions. Using traditional communication tools, a CSR must deal with the questions of each customer one by one, which often results in the CSR repeatedly explaining the same information to different customers.

BRIEF SUMMARY

Dynamically managing an online communication group with a computerized communication tool having at least one processor, according to one aspect of the principles described herein, includes extracting with the computerized communication tool at least one keyword from a private online communication session between at least two parties; and automatically inviting the parties to join an online communication group dedicated to a topic characterized by the at least one keyword with the computerized communication tool.

Dynamically managing an online communication group with a computerized communication tool having at least one process, according to another aspect of the principles described herein, includes receiving with the computerized communication tool a message from a first user directed to a recipient; extracting at least one keyword from the message with the computerized communication tool; if the recipient is a second user, automatically inviting the first user and the second user with the computerized communication tool to join an online communication group having a keyword tag matched to the at least one keyword extracted from the message; and if the recipient is an existing communication group, automatically updating at least one keyword tag associated with the existing communication group with the computerized communication tool.

A computerized communication tool includes at least one processor and a memory communicatively coupled to the processor. The memory includes executable code stored thereon such that the at least one processor is configured to, when executing the executable code: extract at least one keyword from a private online communication session between at least two parties; and automatically invite the parties to join an online communication group dedicated to a topic characterized by the at least one keyword.

A computer program product for dynamically managing an online communication group includes a computer readable storage medium having computer readable program code embodied therewith. The computer readable program code includes: computer readable program code configured to extract at least one keyword from a private online communication session between at least two parties; and computer readable program code configured to automatically invite the parties to join an online communication group dedicated to a topic characterized by the at least one keyword.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
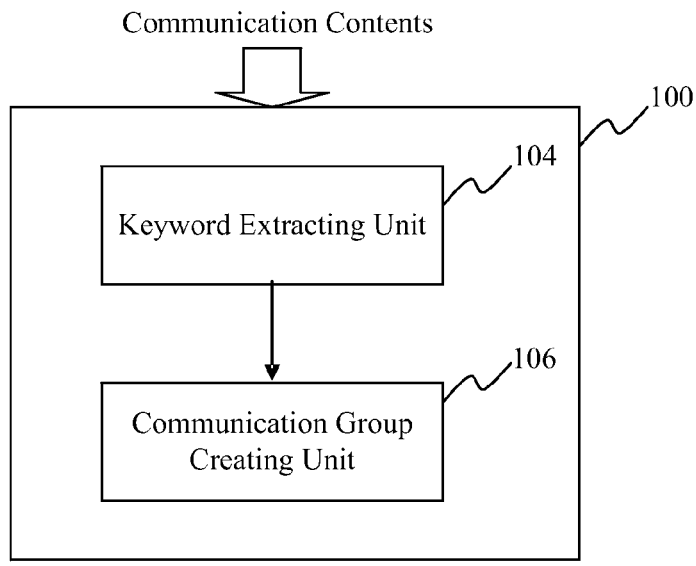
FIG. 1 is a block diagram of an illustrative instant communication tool according to one exemplary embodiment of the principles described herein.

The present specification discloses methods and systems of dynamically managing online communication groups based at least in part on the application of keyword extraction to private online communication sessions. For example, a computerized group management device according to the principles of the present specification may extract keywords from the text entered by one or more participants in an online chat session to determine whether invite the participants to join an online group dedicated to one or more topics discussed in the online chat session. By allowing participants to join an online group, redundant conversations among separate groups of users may be consolidated into a single forum where all participants may benefit from the collective knowledge of the group.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an illustrative instant communication tool according to one embodiment of the invention. In FIG. 1, the communication tool is labeled using 100 generally. To dynamically manage the communication groups related to users' communication contents, the instant communication tool 100 comprises a keyword extracting unit 104 configured to extract keywords at least based on the communication contents inputted by a user; and a communication group creating unit 106 configured to create a new communication group according to the extracted keywords when the communication object of said communication contents is another user.

Specifically, if one user newly initiates a chat with another user, or inputs a new message in the chat with another user, then said another user can be considered as the communication object. That is, the communication contents are private conversation between these two users. In this case, the keyword extracting unit 104 first extracts keywords at least based on the communication contents inputted by said user. The extracted keywords are used to reflect the chat topic between said user and another user. Then the communication group creating unit 106 creates a new communication group according to the extracted results from the keyword extracting unit 104. That is, in the case that said communication object is another user, the communication group creating unit 106 compares the extracted keywords with the keyword tags of existing communication groups and decides whether and how to create a new communication group according to the comparison results.

Figure 2A:
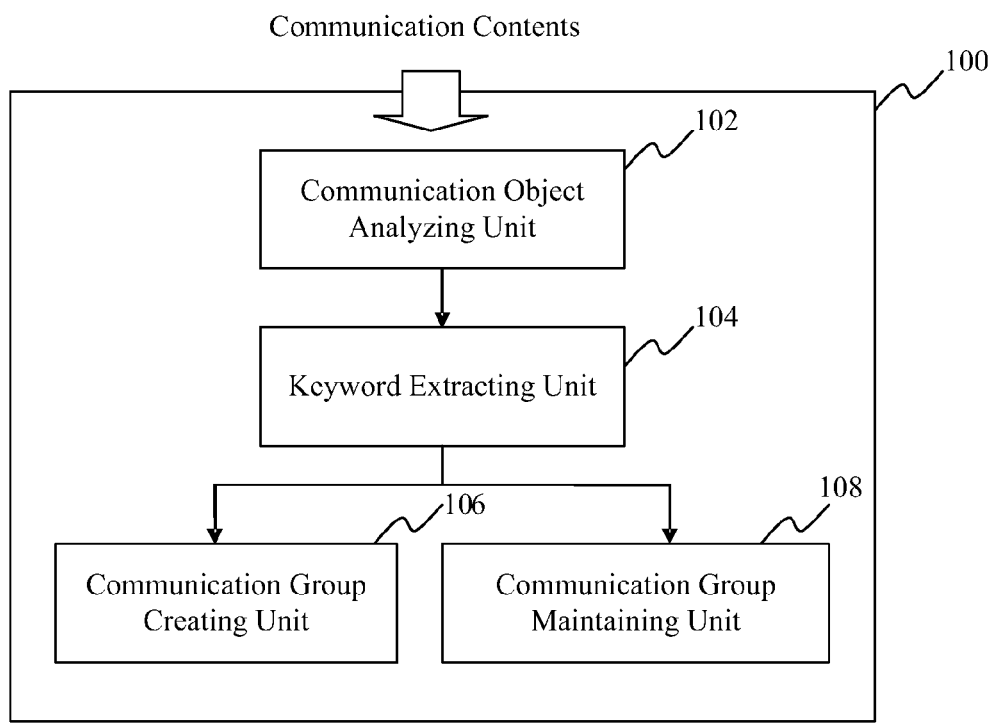
FIG. 2A is a block diagram of an illustrative instant communication tool according to another exemplary embodiment of the principles described herein.

To make the created communication groups instantly reflect users' chat topics in the subsequent communication; a communication group maintaining unit is provided in one embodiment. FIG. 2A illustrates the block diagram of instant communication tool 100 according to another embodiment of the invention. Compared with FIG. 1, the instant communication tool 100 in FIG. 2A further comprises a communication group maintaining unit 108, which is configured to, when the communication object is a certain existing communication group, update the keyword tags of said certain existing communication group according to the extracted keywords.

Specifically, if a user has joined some communication groups, and inputs a message to a certain joined communication group, then this certain existing communication group can be considered as the communication object. Here, the message is open to all members of said certain existing communication group. In this case, the keywords extracted by the keyword extracting unit 104 are used to reflect the current chat topics of the certain communication group. Based on this, the communication group maintaining unit 108 compares said extracted keywords with the original keyword tags of said certain communication group and decides whether to update the keyword tags of this communication group according to the comparison result.

To determine the condition of the communication object, in another embodiment, the instant communication tool 100 also comprises a communication object analyzing unit 102, which is configured to judge whether the communication object of the communication contents is a certain existing communication group or another user and send the judging result to the communication group creating unit 106 and the communication group maintaining unit 108.

Following is the detailed description of the implementation of each unit in the communication tool 100 in connection with examples.

In one embodiment, the communication tool 100 has a plurality of users and maintains a plurality of communication groups. Each communication group has at least one keyword tag, which can reflect the keywords of the whole communication contents in the corresponding communication group.

More particularly, in one example, user A sends a message X to user B. The communication tool 100 not only sends message X to the client end of user B as conventional instant communication tools, but also analyses and judges the object to which message X is sent. In this example, the communication object analyzing unit 102 can easily deduce that the communication object of message X is another user, i.e. user B, by analyzing the object identifier of the message. Here, user A and user B are in private communication status, that is, message X is only sent to user B and would not be inputted into any communication group.

Then, the content of message X is sent to the keyword extracting unit 104. The keyword extracting unit 104 analyses the content of message X and extracts the keywords which can reflect the main content of the message. It is understood that, the extracting results of the keyword extracting unit 104 may be no keyword, one keyword or a plurality of keywords. In case that at least one keyword has been extracted, the keyword extracting unit 104 sends the extracted keywords together with said judging result of the communication object to the communication group creating unit 106.

Then, the communication group creating unit 106 creates a new communication group based on the received judging result and the extracted keywords. Specifically, in case that the communication object is another user, the communication group creating unit 106 compares the extracted keywords with the keyword tags of the existing communication groups. More particularly, in one example, the communication group creating unit 106 compares the extracted keywords with the keyword tags of all existing communication groups. If there is no existing keyword tag matching with the extracted keywords, it can be considered that message X sent from user A creates a new topic over all communication groups and therefore it is suitable for creating a new communication group. Then, the communication group creating unit 106 can provide for user A and user B an option suggesting them to create a new communication group. If user A and user B choose to accept the option of creating the communication group, then the communication group creating unit 106 creates a new communication group based on the chat between user A and user B and labels this new communication group using said extracted keywords as the keyword tags. If user A or user B does not accept the option, then these two users will keep their private chat status. If, after comparison, the communication group creating unit 106 finds that the extracted keywords matches with the keyword tags of some existing communication groups, it can be considered that there are already other communication groups discussing subject topics similar with message X. Then, the communication group creating unit 106 sends user A and user B an invitation suggesting them to join the existing communication groups. User A and user B can join the existing communication groups by accepting the invitation. If the extracted keywords are more than one, it is possible to find a plurality of existing communication groups whose keyword tags match with the extracted keywords. The communication group creating unit 106 can present all such keyword tags of these communication groups to user A and user B. User A and user B can accept the invitation by for example clicking the keyword tag of their desired communication group.

In another example, the communication group creating unit 106 only compares said extracted keywords with the keyword tags of the existing communication groups related to user A and user B. For example, when sending message X to user B, user A has already created or joined 3 communication groups whose keyword tags are respectively A1, A2 and A3 (the keyword tags are used to indicate the corresponding communication group in the following context); user B has created or joined communication groups B1 and B2. Then, the communication group creating unit 106 only compares the extracted keywords from message X with communication group tags A1, A2, A3, B1 and B2 without considering other irrelative communication groups. If there is no keyword tag matching with said extracted keyword, it can be considered that message X sent from user A creates a new topic compared with the related existing communication groups of user A and user B and it is suitable for creating a new communication group. Similarly, the communication group creating unit 106 provides for user A and user B an option of creating a new communication group, creates a new communication group when they all accept the option, and labels this new communication group using said extracted keywords as the keyword tags. If, after comparison, the communication group creating unit 106 finds that the extracted keywords match with the keyword tags of the existing communication groups created or joined by any of the two users, for example, match communication group B2 joined by user B, then it can be considered that user B is talking with other users on topics similar with message X in communication group B2. The communication group creating unit 106 can thus send to user A an invitation suggesting him to join in communication group B2 in which user B has already joined. Since user B has already been in communication group B2, the communication group creating unit 106 need not to send invitation to user B. Similarly, if the extracted keywords are found after comparison to be the same as the group in which user A has joined, like A1, unit 106 only needs to send an invitation to user B to suggest him to join communication group A1. User A and user B can join in the existing communication group by accepting the invitation.

In particular embodiments, according to the configuration of the instant communication tool 100, the above-mentioned "matching" between extracted keywords and existing keyword tags can comprise the cases that the two are identical, the two have similar semantic meaning, or one's meaning includes the other's, etc. The similarity or including of word meaning can be defined using existing word database or algorithms.

With the above manner, the communication group creating unit 106 can create a new communication group upon users' confirmation when the communication between two users creates a new topic, and label the new communication group using the extracted keywords as the keyword tags.

In one embodiment, the above communication tool can maintain a communication group keyword tag list for storing the keyword tags of the existing created communication groups. More advantageously, said list is further associated with each user to store their created or joined existing communication groups. Based on this, said communication group creating unit 106 can search the keyword tags matching the extracted keywords in the above list to judge whether to create a new communication group or not.

In the above embodiment, the keyword extracting unit 104 extracts keywords based on message X newly inputted by user A. However, in some cases, the newly-inputted message X may contain little effective information from which it is difficult to extract keywords, such that the keyword extracting unit 104 is made to return null result. For example, in the chat newly initiated from user A to user B, the first inputted message is usually a greeting like "hi", "are you free", etc. Meaningful keywords usually cannot be extracted only based on such information. Therefore, in other embodiments, the newly-inputted message X can be firstly added into the communication records between user A and user B by the communication object analyzing unit 102 or the keyword extracting unit 104, and then keywords can be extracted based on such communication records. The keywords extracted in such manner can better reflect the continuous chat contents between user A and user B. In further embodiments, the keyword extracting unit 104 extracts keywords based on a part of said communication records, for example, based on the communication records in the latest 2 minutes, to reflect the latest communication topic.

The implementation of corresponding units in communication tool 100 is described above in connection with examples of communication between two users. However, since the communication tool 100 maintains a plurality of communication groups, one user can not only communicate with another user privately, but also communicate with other members in a group by sending a message into the group. Following is the description of the implementation of each unit in communication tool 100 in this case.

In one particular example, user A has joined communication group G1 and sent a message Y to this communication group such that all members in this group can receive the message. After the communication tool 100 captures said message Y, the communication object analyzing unit 102 can firstly make analysis and judgment on it. In this example, the communication object analyzing unit 102 can easily judge that the communication object of message Y is the certain existing communication group G1 by analyzing the object identifier of this message. After determining the communication object as an existing communication group, the communication object analyzing unit 102 adds the newly-inputted message Y into the communication records of this communication group and sends the communication records to the keyword extracting unit 104.

After receiving said communication records, the keyword extracting unit 104 analyzes the communication records which contain message Y and extracts the keywords capable of reflecting the communication contents. In one example, the keyword extracting unit 104 analyzes all communication records of the communication group and extracts the keywords. In another example, the keyword extracting unit 104 only analyzes a part of the communication records of the communication group, for example, the communication records in the latest 5 minutes, based on which the keywords are extracted to reflect the latest communication topic. It is understood that said part of the communication records may be defined in various ways as, for example, the latest communication records in a pre-defined period, the latest communication records of pre-defined bytes, etc. After obtaining the keywords by various ways, the keyword extracting unit 104 sends the extracted keywords together with said judging result of the communication object to the communication group maintaining unit 108.

Then, the communication group maintaining unit 108 updates the corresponding communication groups according to the received judging result and the extracted keywords. Specifically, in the case that the communication object is a certain existing communication group, e.g. group G1, the communication group maintaining unit 108 compares the extracted keywords with the existing keyword tag G1 of this communication group. If the newly extracted keywords do not match with the existing keyword tag G1, it is considered that the members in this communication group have changed the topic, and therefore it is necessary to update the keyword tag of this communication group to the extracted keywords so as to better reflect the current communication contents. If the extracted keywords match with the existing keyword tag G1, the keyword tag is not changed. Thus, the communication group maintaining unit 108 maintains the keyword tags of each communication group dynamically by timely updating the keyword tags of certain communication group if it finds the communication in that group deflects the original topic, so as to ensure the keyword tags of each communication group can really reflect the current communication topics.

To avoid some unnecessary disturbance which may cause the communication group tags to change too frequently, the communication group maintaining unit 108 can be further configured to update the keyword tag of the communication group using the extracted keywords only when the extracted keywords from the keyword extracting unit 104 are the same in successive n times. The particular threshold number n can be set as desired.

In specific embodiments, the communication group maintaining unit 108 is further configured to monitor the number of members in each communication group and close a communication group when all members therein leave the communication group.

From the above description in connection with specific examples, the instant communication tool 100 can dynamically manage communication groups. Specifically, in the private chat between two users, the communication group creating unit 106 judges whether there is an existing communication group with similar topic according to the keywords of the private chat, and creates a new communication group when the private chat starts a new topic. In the communication of users in an existing communication group, the communication group maintaining unit 108 judges whether the communication among the members in the group deflects the original topic according to the keywords of the communication records of this communication group, and updates the keyword tags of this communication group when the topic has changed. Therefore, the execution of communication group creating unit 106 and the maintaining unit 108 both depends on the extracting result of the keyword extracting unit 104. The extracting result is especially important for the keyword tags of the created or maintained communication groups to really reflect the topic of the corresponding groups. To extract these keywords, the keyword extracting unit 104 can be configured to adopt any proper keyword extracting method in the existing techniques. Following are two specific examples of keyword extracting. However, it is understood that those skilled in this art can extend the examples upon studying this specification.

In one particular embodiment, the keyword extracting unit 104 can adopt the vector-based keyword extracting method. In this method, for each keyword, firstly a series of relative words are defined to construct a vector:

$$KEYWORD1:T1=[(K11,W11),(K12,W12),(K13,W13)\ldots(K1n,W1n)]$$

$$KEYWORD2:T2=[(K21,W21),(K22,W22),(K23,W23)\ldots(K2n,W2n)]$$

$$\ldots$$

$$KEYWORDm:Tm=[(Km1,Wm1),(Km2,Wm2),(Km3,Wm3)\ldots(Kmn,Wmn)]$$

In this example, Tm is a vector, Kmn is the $n^{th}$ relative word of keyword KEYWORDm, Wmn is the weight of this relative word.

Then keyword extracting can be performed on the inputted text. Specifically, the keyword extracting is carried out by primarily scanning the text, segmenting the words if necessary (e.g. for Chinese text), and removing meaningless words after segment. Then relative words are calculated for the extracted words, i.e. valid words:

$$Umn=(\text{number of }Kmn)/(\text{number of valid words})*Wmn$$

$$Sim(Tm)=Um1+Umm+\ldots+Umn$$

The bigger Sim(Tm) is, the higher the relativity between the text and KEYWORDm is. A threshold can be set for Sim(Tm). KEYWORD whose Sim(Tm) is bigger than the threshold is considered as the keyword of this text. Alternatively, one or more KEYWORD with the biggest Sim(Tm) can be the keywords of this text.

The vector-based keyword extracting method is a simple and basic extracting method. In practice, the distinction between lexical level (term for meaning) and conceptual level (the meaning itself) of a word may result in inaccuracy of the extracted keywords using such simple method. For example, words with different expressions may have the same meaning, while words with the same expression may have different meanings in different contexts. Therefore, the keyword extracting unit 104 can adopt more complicated extracting method to improve the extracting accuracy. In another particular embodiment, the keyword extracting unit 104 can adopt the semantic-based keyword extracting method, specifically, using senses instead of words and considering the sense of the candidate keyword to improve the performance of the keyword extracting method. Different from the vector-based keyword extracting method, this method first gets the sense of the candidate keywords from the context using disambiguation algorithm, and then, in the following steps of word combination, feature extraction and evaluation, uses the semantic correlation degree between the candidate keywords to improve the algorithm performance.

Specifically, the semantic-based keyword extracting method firstly needs to get the sense. The sense defined in WordNet can be used to present the meaning of a word. WordNet contains 155327 words and 117597 senses. In the text inputted into the extracting unit, there are two kinds of words: single word and combination word. A single word only comprises one word which can be found in WordNet, while a combination word itself cannot be found in WordNet. However, the combination word is composed of a plurality of words defined in WordNet and takes the combination of the meanings of the composed words as its meaning. The senses of the candidate keywords can be obtained using disambiguation algorithm. The words near the disambiguated word in the text are used as context for judging the meaning of this word.

After getting the sense, it needs to choose the candidate keywords. In this process, words filtering in the text are firstly carried out, including removing numbers, various punctuations, some words which do not comply with keyword standards, such as words exceeding length limitation, proper names, words starting or ending with stop words, etc. For Latin words, iterative Lovins algorithm can be adopted to get the root of each word. This algorithm firstly removes the prefix and suffix of words, and continues the process iteratively until the word does not change, through which the word root is obtained.

After the above process, the sense of the candidate keywords can be obtained using disambiguation algorithm. The sense is determined through the words around the candidate keyword. The disambiguation algorithm calculates the correlation degree between any possible sense of the disambiguated word and the sense of the around words, and regards the sense with the highest correlation degree as the right sense of this word in the context. Specifically, extended gloss overlap algorithm can be adopted to realize the correlation degree analysis and disambiguation. The algorithm gets the correlation degree value by calculating the number of the common words in the annotation among the words and the number of the overlapped words in the explanation of the words related to the word in WordNet.

After the disambiguation of the keywords, the candidate keywords can be combined based on the senses. In this process, firstly, the semantic correlation degree among the keywords is calculated. Then a threshold a is defined. If the correlation degree between two words is higher than a, it can be considered the two words are the same semantically and can be proceeded as one word.

Based on the obtained candidate keywords, the features for machine leaning are chosen. The machine leaning method needs to define some features to create a model from the training documents and predicts keywords in new documents using said model. In the method as an example, four features can be chosen: TF×IDF, First occurrence, Length and Coherence.

TF×IDF denotes the frequency of a word in a document comparing with the number of the documents which contain the word in the training set. The higher TF×IDF value of a word is, the more possibly the word is the keyword. First occurrence denotes the average position of a word occurring in a document for the first time. The words which occur at the beginning or end of the document have higher probability of being keywords. Length denotes the number of the words composing a phrase. The above three features are also used in Kea++ algorithm. Feature Coherence has been proved to be capable of improving the keyword extracting performance to a great extent. Unlike the statistic-based algorithms, this algorithm determines the coherence of words using the semantic correlation degree calculated based on WordNet. Supposed set S denotes the candidate keyword senses, and then the value of coherenceScore of S can be obtained by summing the semantic correlation degree between sense S and other senses in the set, which is shown as formula (1):

$$coherenceScore_{S_i} = \frac{\sum_{j=1, j \neq 1}^{|S|} (S_i, S_j)}{|S| - 1}$$

In formula (1), the denominator is used to normalize the value of coherenceScore. If the coherenceScore of a candidate keyword sense is higher, it is considered to have higher correlation degree with other senses in the candidate keyword sense set. The above four features are all continuous quantities. To be applicable in machine learning methods, these continuous quantities can be converted into discrete quantities using any approach. For example, the quantities may be divided into N ranges each of which contains nearly the same samples.

Based on this, keyword extracting can be executed. Specifically, the Naive Bayes Model is created from the training documents using the above four features. For each document in the training set, it is firstly processed using the above steps. Then, for each candidate keyword, two values thereof are calculated using the following two formulas:

$$Pr[\text{yes} | T, O, L, C] = \frac{Pr[T|\text{yes}] \times Pr[O|\text{yes}] \times Pr[L|\text{yes}] \times Pr[C|\text{yes}] \times Pr[\text{yes}]}{Pr[T, O, L, C]}$$

$$Pr[\text{no} | T, O, L, C] = \frac{Pr[T|\text{no}] \times Pr[O|\text{no}] \times Pr[L|\text{no}] \times Pr[C|\text{no}] \times Pr[\text{no}]}{Pr[T, O, L, C]}$$

These two values respectively presents the value of TF×IDF (T), First occurrence (O), Length (L) and Coherence (C) when the candidate keyword is the keyword or not. The first value denotes the probability of the word being a keyword. To normalize it, the denominator is introduced. The second is similar, which denotes the probability of the word being not a keyword. Finally, the overall probability that the word is a keyword can be calculated using the following formula:

$$Pr = \frac{Pr[\text{yes} | T, O, L, C]}{Pr[\text{yes} | T, O, L, C] + Pr[\text{no} | T, O, L, C]}$$

Then, the candidate keywords are ordered by Pr and the keywords as required by users are returned according to the order.

With above detail described implementation, the keyword extracting unit 104 can extract the keywords based on users' communication contents to reflect the topics of users' communication. It is understood that such keywords are extracted freely without any other limitation. However, for some users of the communication tool, for example, CSR, they are probably unwilling to create so many unrelated communication groups without limitation with their customers. For system administrators of the communication tool, they may also want to manage these communication groups more effectively. Thus, other embodiments of the invention may further provide the function of keyword limitation.

Figure 2B:
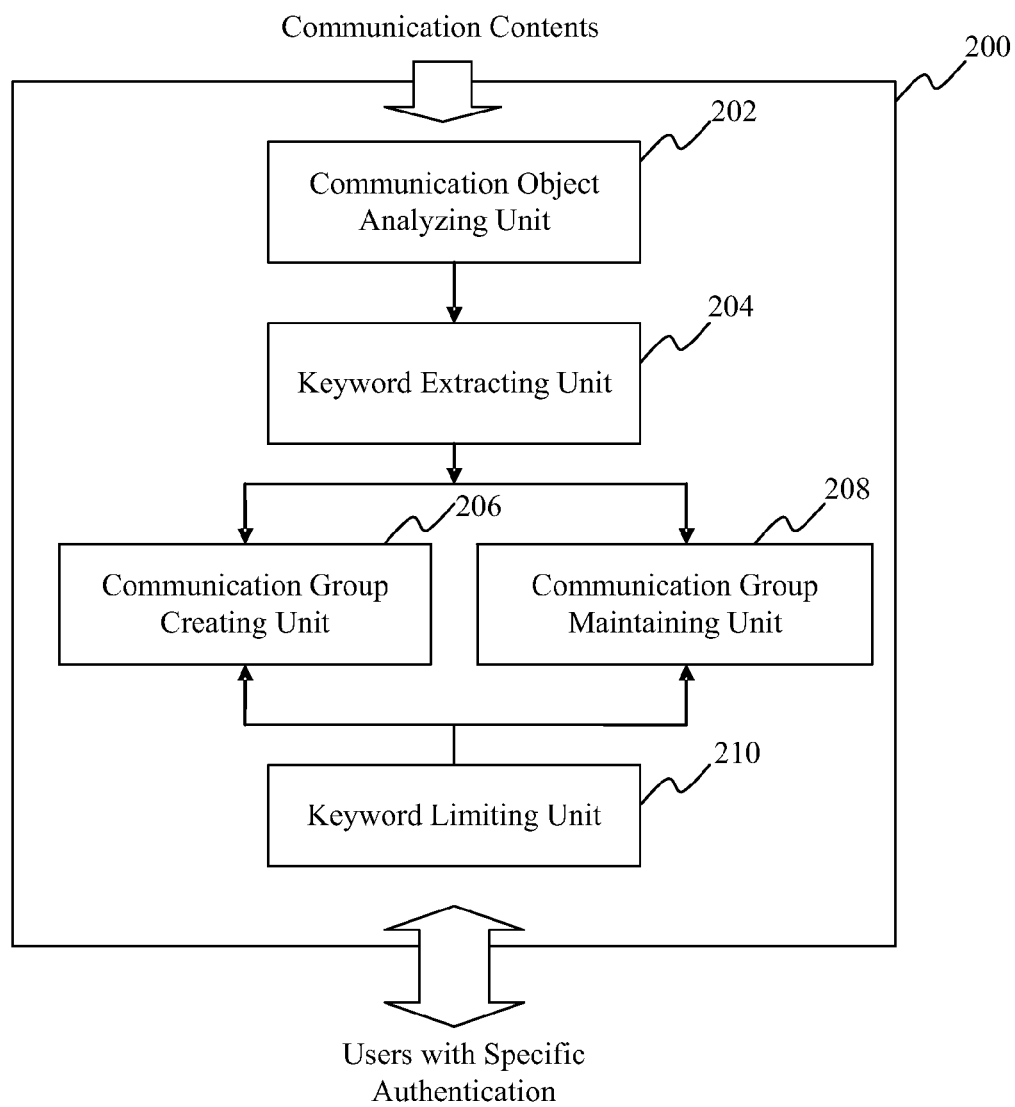
FIG. 2B is a block diagram of an illustrative instant communication tool according to another exemplary embodiment of the principles described herein.

FIG. 2B illustrates the block diagram of the instant communication tool according to further another embodiment of the invention. In FIG. 2B, the communication tool is labeled using 200 as a whole, wherein the communication object analyzing unit 202, the keyword extracting unit 204, the communication group creating unit 206, and the communication group maintaining unit 208 correspond to the respective units in FIG. 2A with similar configuration and function. Following is only to describe the difference between communication tool 200 and 100.

As shown in FIG. 2B, the communication tool 200 additionally comprises a keyword limiting unit 210, which is configured to receive and store the limitation to keywords. Specifically, the keyword limiting unit 210 may contain an interface of the communication tool 200, which is optionally exposed to particular users or administrators. For example, system administrators can set the desired keyword scope via this interface to better manage these communication groups. Then the keyword limiting unit 210 can store the setting of the administrators and inform the communication group creating unit 206 and the communication group maintaining unit 208 about the setting. Correspondingly, the communication group creating unit 206 is further configured to create new communication groups according to the extracted keywords referring to the above keyword setting. In an embodiment, the communication group creating unit 206 firstly judge whether the extracted keywords meet the above keyword setting. Only if the extracted keywords fall into the keyword scope set by administrators, the communication group creating unit 206 continues to create communication groups. Similarly, the communication group maintaining unit 208 also needs to refer to the keyword setting when updating the keyword tags of communication groups. For example, tags updating is performed only when the newly-extracted keywords meet the above keyword setting.

The above interface can also be exposed to users with special authentication and requirement, e.g. the CSR. Thereby the CSR can set the scope of the communication groups constructed by his related talking via this interface. For instance, an online store which sells phone cards may only sell several kinds of cards C1, C2, C3 and C4. Then its CSR can set the scope of related communication groups as C1, C2, C3 and C4. Correspondingly, the communication group creating unit 206 will firstly refer to his keyword setting when processing the communication related to this CSR. Only when the keywords of the communication with this CSR are in scope C1-C4, unit 206 creates new communication groups and/or invites the other side to join in the communication groups. Thus, when talking with the CSR, the customer may be suggested to join into related communication groups only when their communication concerns the above kinds of phone cards. Therefore, the CSR can avoid creating communication groups irrelative to the store's business.

It can be seen from the above embodiment, the configuration of the keyword limiting unit 210 provides further advantageous management function for the communication tool 200. It is understood that those skilled in this art can extend the function based on the communication tool 100 or 200 within the scope of the invention.

Figure 3:
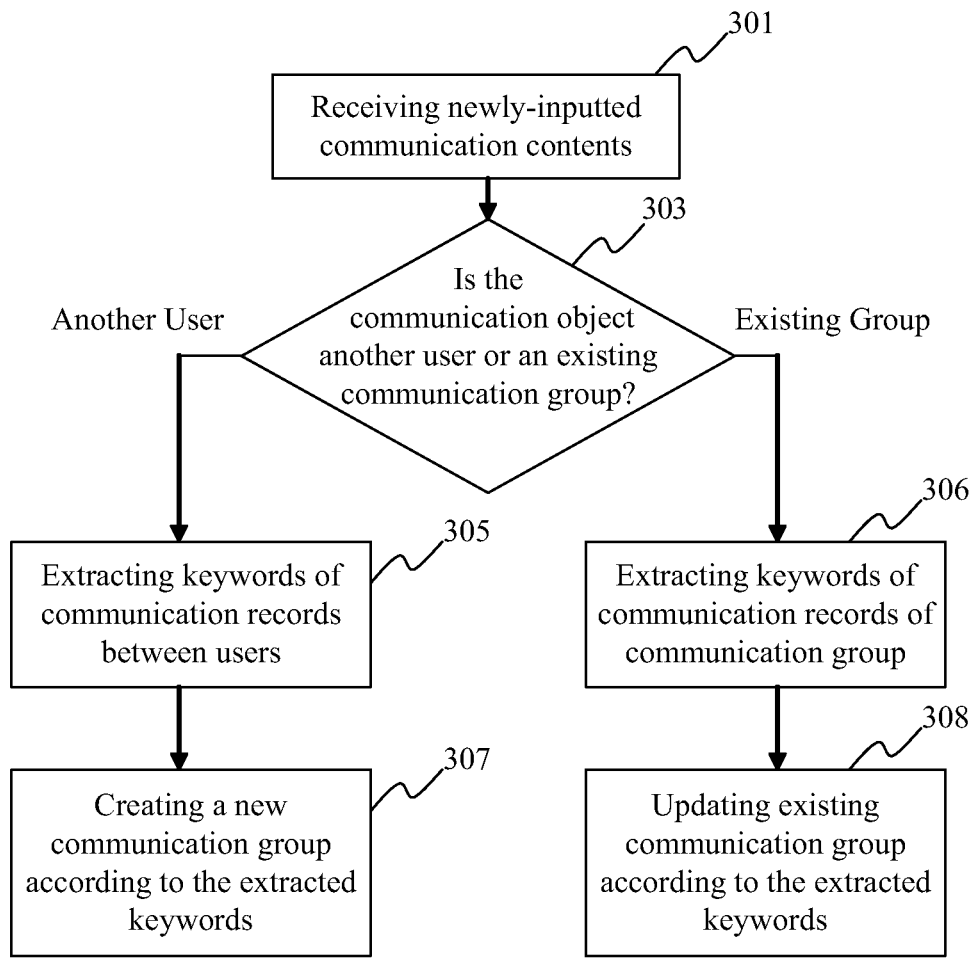
FIG. 3 is a flowchart diagram of an illustrative method for dynamically managing online communication groups according to one exemplary embodiment of the principles described herein.

Based on the same inventive conception, the invention also provides a method for dynamically managing communication groups. FIG. 3 illustrates the flowchart of the method of dynamically managing the communication groups according to one embodiment of the invention. As shown in FIG. 3, firstly, a newly-inputted message is received from a user at step 301. Then the communication object of this message is determined at step 303. Specifically, it can be obtained according to the object identifier of the message whether the communication object of this message is another user or certain existing communication group.

If the communication object is judged as another user after step 303, the method proceeds to step 305 in which keywords of the communication contents between the two users are extracted. In one embodiment, the keywords are extracted only based on the newly-inputted message. In another embodiment, the newly-inputted message is firstly added into the communication records of the two users, and then the keywords are extracted based on at least a part of the communication records. After the keywords are extracted, the method advances to step 307 in which new communication groups are created according to the extracted keywords.

In one embodiment, the extracted keywords are compared with the keyword tags of all existing communication groups at step 307. If there is no existing keyword tag matching with the extracted keywords, it can be considered that the newly-inputted message creates a new topic over all communication groups. Thus it is suitable to create a new communication group. At this time, an option can be provided to the relative users, suggesting them to create a new communication group. If the two users accept the option of creation, a new communication group is created based on the communication contents and labeled using the above extracted keywords as its keyword tags. If, after comparison, the extracted keywords are found to be the same as keyword tags of some existing communication groups, it can be considered that there are already other communication groups discussing similar topics. Then an invitation can be sent to the relative users, suggesting them to join into the existing communication groups.

In another embodiment, in step 307, said extracted keywords are only compared with the keyword tags of the existing communication groups which relate to the relative users, without considering the communication contents of other irrelative users.

If the communication object is judged as certain existing communication group after step 303, the method proceeds to step 306 in which keywords of the communication records of this communication group are extracted. Specifically, the newly-inputted message can be firstly added into the communication records of this communication group, and then the keywords are extracted based on at least a part of the communication records. After the keywords are extracted, the keyword tags of said certain existing communication group can be updated according to the extracted keywords at step 308.

Specifically, the newly-extracted keywords are compared with the original keyword tags of this certain communication group at step 308. If they do not match, it is considered that the members of this communication group have changed the topic. Therefore the keyword tags of this communication group are updated using the newly-extracted keywords to better reflect the current communication contents. If the newly-extracted keywords match with the original keyword tags, the keyword tags are kept unchanged.

Figure 4:
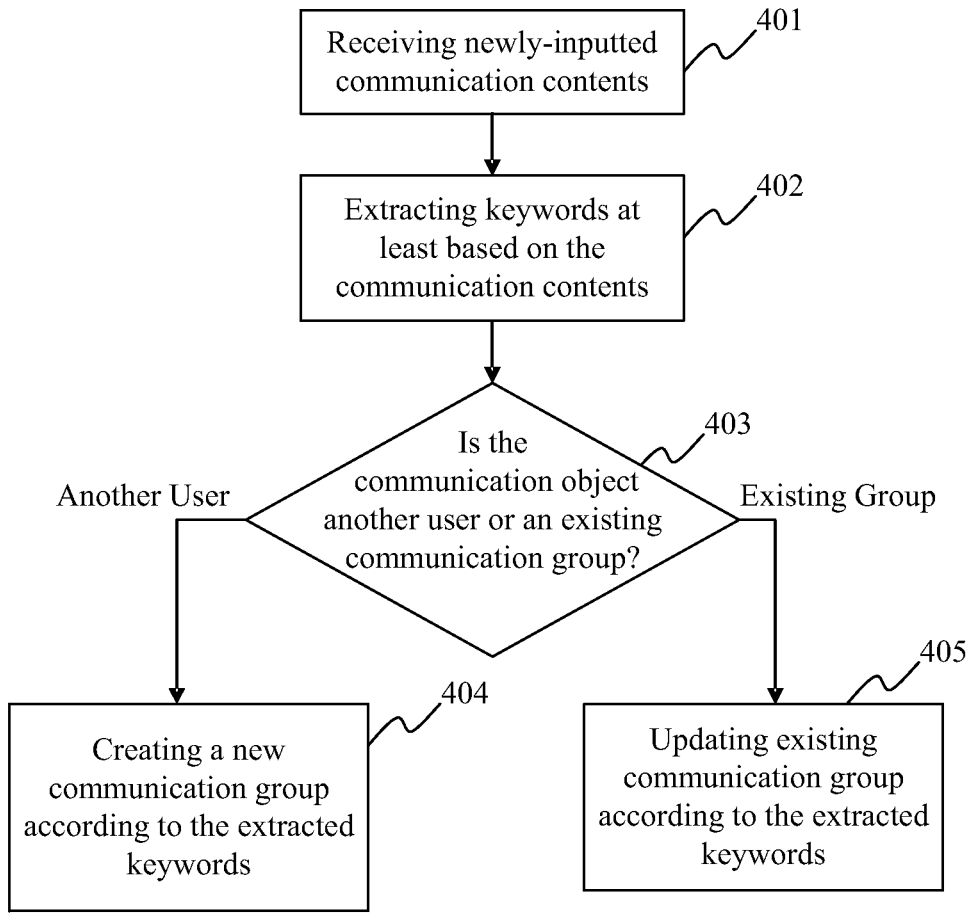
FIG. 4 is a flowchart diagram of another illustrative method for dynamically managing online communication groups according to another exemplary embodiment of the principles described herein.

It is understood that, the above communication object judging step and keyword extracting step are not necessarily executed as the sequence shown in FIG. 3. Alternatively, FIG. 4 illustrates the flowchart of the method for dynamically managing the communication groups according to another embodiment of the invention. In FIG. 4, similarly, a newly-inputted message is firstly received from a user at step 401. Then keywords are extracted at least based on said message at step 402. Specifically, the message can be firstly added into the communication records between the user and the current communication object, and then the keywords are extracted based on at least a part of the communication records. After that, judgment is made at step 403 as to whether the communication object of said message is another user or certain existing communication group. If the communication object is another user, the method advances to step 404 in which a new communication group is created according to the extracted keywords. In the case that the communication object is certain existing communication group, the method proceeds to step 405 in which the keyword tags of this communication group are updated according to the extracted keywords. The implementation of step 404 and 405 is similar to step 307 and 308 in FIG. 3, which is needless to describe in detail.

In further embodiments of this invention, the method for dynamically managing communication groups further comprises receiving and storing the limitation on keywords, and creating and maintaining communication groups referring to the keyword limitation.

It is understood that, the communication tool in FIGS. 1, 2A and 2B can be used to execute the method in FIGS. 3 and 4; the method in FIGS. 3 and 4 can be embodied using the communication tool in FIGS. 1, 2A and 2B.

Through the above description of the embodiments, those skilled in the art will recognize that the above-mentioned communication tool and method can be practiced by executable instructions and/or controlling codes in the processors e.g. codes in mediums like disc, CD or DVD-ROM, in memories like ROM or EPROM, and in carriers like optical or electronic signal carrier. Moreover, the communication tool and its units can be realized using hardware like VLSI or Gates and Arrays, like semiconductors e.g. Logic Chip, transistors, etc., or like programmable hardware equipments e.g. FPGA, programmable logic equipments, etc.; or using software executed by different kinds of processors; or using the combination of said hardware and software.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

The invention claimed is:

1. A method of dynamically managing an online communication group with a computerized communication tool comprising at least one processor, said method comprising:
   extracting with said computerized communication tool at least one keyword from a private online communication session between at least two parties;
   with said computerized communication tool, comparing said at least one keyword extracted from said private online communication with keyword tags associated with existing online communication groups; and
   in response to said at least one keyword matching a keyword tag for an existing online communication group, automatically inviting said parties to join that online communication group dedicated to a topic characterized by said at least one keyword, said inviting being performed with said computerized communication tool.

2. The method of claim 1, wherein said matching said at least one keyword extracted from said private online communication session with at least one keyword tag associated with said existing online communication group comprises determining whether said at least one keyword extracted from said private online communication session is identical to said at least one keyword tag associated with said existing online communication group.

3. The method of claim 1, wherein said matching said at least one keyword extracted from said private online communication session with at least one keyword tag associated with said existing online communication group comprises determining whether said at least one keyword extracted from said private online communication session is semantically equivalent to said at least one keyword tag associated with said existing online communication group.

4. The method of claim 1, wherein said matching said at least one keyword extracted from said private online communication session with at least one keyword tag associated with said existing online communication group comprises determining whether one of said at least one keyword extracted from said private online communication session and said at least one keyword tag associated with said existing online communication group falls within a semantic scope of the other of said at least one keyword extracted from said private online communication session and said at least one keyword tag associated with said existing online communication group.

5. The method of claim 1, further comprising creating a new online communication group in response to a determination that no existing online group comprises a keyword tag that matches said at least one keyword extracted from said private online communication session.

6. The method of claim 1, further comprising making said parties members of said online communication group in response to an acceptance of said invitation by each of said parties.

7. The method of claim 6, wherein said making said parties members of said online communication group in response to an acceptance of said invitation by each of said parties comprises converting said private online communication session to a message exchange within said online communication group.

8. The method of claim 6, further comprising dynamically updating said keyword tag associated with said online communication group by continuously applying keyword extraction to messages exchanged within said online communication group and determining at least one current topic of said online communication group.

9. The method of claim 1, wherein messages posted to said online communication group by a member of said online communication group are viewable at least by any other member of said online communication group.

10. The method of claim 1, wherein said keyword extraction is applied to a previously archived conversation between said parties of said private online communication session.

11. The method of claim 1, wherein said keyword extraction is applied only to text recently exchanged between said parties in said private online communication session as defined by a predetermined time window.

12. The method of claim 1, wherein said keyword extraction comprises vector-based keyword extraction.

13. A method of dynamically managing an online communication group with a computerized communication tool comprising at least one processor, said method comprising:
   receiving with said computerized communication tool a message from a first user directed to a recipient;
   extracting at least one keyword from said message with said computerized communication tool;
   if said recipient is a second user, automatically inviting said first user and said second user with said computerized communication tool to join an online communication group comprising a keyword tag matched to said at least one keyword extracted from said message; and
   if said recipient is an existing communication group, automatically updating at least one keyword tag associated with said existing communication group with said computerized communication tool based on said at least one extracted keyword.

14. The method of claim 13, wherein said online communication group which said first user and said second user are invited to join comprises an existing online communication group.

15. The method of claim 13, wherein said online communication group which said first user and said second user are invited to join comprises a new online communication group created in response to said at least one keyword extracted from said message.

16. The method of claim 13, wherein said online communication group which said first user and said second user are invited to join is managed by said computerized communication tool.

17. The method of claim 13, further comprising automatically adding said first user and said second user as members of said online communication group which said first user and said second user were invited to join in response to an acceptance of said invitation from each of said first user and said second user.

18. A computerized communication tool, said computerized communication tool comprising:
- at least one processor; and
- a memory communicatively coupled to said processor, said memory comprising executable code stored thereon such that said at least one processor is configured to, when executing said executable code:
  - extract at least one keyword from a private online communication session between at least two parties, wherein each party is an individual user; and
  - automatically invite said parties to join an online communication group dedicated to a topic characterized by said at least one keyword.

19. The computerized communication tool of claim 18, wherein said at least one processor is further configured to, when executing said executable code, dynamically manage said online communication group.

20. The computerized communication tool of claim 18, wherein said at least one processor is further configured to, when executing said executable code, match said at least one keyword extracted from said private online communication session with at least one keyword tag associated with an existing online communication group.

21. The computerized communication tool of claim 18, wherein said online communication group is anew online communication group created in response to said at least one keyword extracted from said private online communication session.

22. The computerized communication tool of claim 18, wherein said at least one processor is further configured to, when executing said executable code, make said parties members of said online communication group in response to an acceptance of said invitation by each of said parties.

23. A computer program product for dynamically managing an online communication group, the computer program product comprising:
- a computer readable storage medium having computer readable program code embodied therewith, the computer readable program code comprising:
  - computer readable program code configured to extract at least one keyword from an electronic message sent by a first user to a recipient;
  - computer readable program code configured to determine if said recipient is a second user or an online communication group; and
  - if said recipient is a second user, automatically invite said first user and said second user with said computerized communication tool to join an online communication group comprising a keyword tag matched to said at least one keyword extracted from said message; and
  - if said recipient is an existing communication group, automatically update at least one keyword tag associated with said existing communication group with said computerized communication tool based on said at least one extracted keyword.

24. The method of claim 1, wherein said comparing said at least one keyword extracted from said private online communication with keyword tags associated with existing online communication groups is performed only with respect to a subset of the existing online communication groups that are already associated with one of said parties to said private online communication session.

25. The method of claim 13, wherein said automatically updating at least one keyword tag associated with said existing communication group is only performed when a same keyword has been extracted from received message a number of times equaling a threshold number.

\* \* \* \* \*